(12) United States Patent
Chamayou et al.

(10) Patent No.: US 9,469,755 B2
(45) Date of Patent: Oct. 18, 2016

(54) PROCESS FOR TRANSITIONING

(71) Applicant: Ineos Europe AG, Vaud (CH)

(72) Inventors: Jean-Louis Chamayou, Carry le Rouet (FR); Stephen Kevin Lee, London (GB)

(73) Assignee: INEOS EUROPE AG, Vaud (CH)

( * ) Notice: Subject to any disclaimer, the term of this patent is extended or adjusted under 35 U.S.C. 154(b) by 0 days.

(21) Appl. No.: 14/649,262

(22) PCT Filed: Dec. 13, 2013

(86) PCT No.: PCT/EP2013/076531
§ 371 (c)(1),
(2) Date: Jun. 3, 2015

(87) PCT Pub. No.: WO2014/095626
PCT Pub. Date: Jun. 26, 2014

(65) Prior Publication Data
US 2015/0322249 A1 Nov. 12, 2015

(30) Foreign Application Priority Data

Dec. 18, 2012 (EP) .................................. 12197833
Dec. 18, 2012 (EP) .................................. 12197874

(51) Int. Cl.
| C08L 23/00 | (2006.01) |
| C08L 23/08 | (2006.01) |
| C08F 210/16 | (2006.01) |
| B01J 19/24 | (2006.01) |
| C08F 2/01 | (2006.01) |
| C08F 2/34 | (2006.01) |
| C08F 2/42 | (2006.01) |

(52) U.S. Cl.
CPC ............ C08L 23/0815 (2013.01); B01J 19/24 (2013.01); C08F 2/01 (2013.01); C08F 2/34 (2013.01); C08F 2/42 (2013.01); C08F 210/16 (2013.01); B01J 2219/0004 (2013.01); B01J 2219/24 (2013.01)

(58) Field of Classification Search
CPC ............. C08F 2/01; C08F 2/34; C08F 2/42; C08L 23/0815; B01J 19/24; B01J 2219/0004; B01J 2219/24; B01J 19/242; B01J 19/245
See application file for complete search history.

(56) References Cited

U.S. PATENT DOCUMENTS

| 6,838,532 B2 | 1/2005 | Veariel et al. |
| 6,867,270 B2 | 3/2005 | Savatsky et al. |
| 8,148,481 B2 | 4/2012 | Hussein et al. |
| 2004/0127655 A1 | 7/2004 | Veariel et al. |
| 2004/0167299 A1 | 8/2004 | Savatsky et al. |
| 2004/0214969 A1 | 10/2004 | Ehrman et al. |

FOREIGN PATENT DOCUMENTS

| EP | 0 494 316 B1 | 5/1996 |
| WO | WO 00/58377 A1 | 10/2000 |
| WO | WO 2004/060922 A2 | 7/2004 |
| WO | WO 2004/060922 A3 | 7/2004 |
| WO | WO 2011/089112 A1 | 7/2011 |

OTHER PUBLICATIONS

Specification of Co-pending U.S. Appl. No. 14/649,322, filed Jun. 3, 2015, which is a National Phase of PCT International Application No. PCT/EP2013/076529 (WO 2014/095624 A1), filed Dec. 13, 2013, 25 pgs.

Primary Examiner — Nathan M Nutter
(74) Attorney, Agent, or Firm — Nixon & Vanderhye P.C.

(57) ABSTRACT

Process for transitioning from the production of a first polymer to the production of a second polymer in a gas phase fluidized bed or stirred bed reactor by a) conducting a first polymerization reaction in the reactor using a first polymerization catalyst system to produce a first polymer, b) stopping the first polymerization reaction and removing at least the majority of the polymer in the reactor, c) introducing into the reactor a seed-bed containing at least 50 ppm of contaminants, in which the seedbed is maintained under at least 50 ppm but less than 500 ppm of contaminants during storage, and d) treating the seed-bed in the reactor to reduce the amount of contaminants. Step e) involves conducting a second polymerization reaction in the reactor to produce a second polymer.

20 Claims, No Drawings

PROCESS FOR TRANSITIONING

This application is the U.S. national phase of International Application No. PCT/EP2013/076531 filed Dec. 13, 2013 which designated the U.S. and claims priority to European Patent Application Nos. 12197874.6 filed Dec. 18, 2012 and 12197833.2 filed Dec. 18, 2012, the entire contents of each of which are hereby incorporated by reference.

The present invention relates to a process for transitioning from the production of a first polymer to the production of a second polymer in a gas phase fluidised bed reactor.

Numerous methods are known for transitioning between production of different polymer products in a polymerisation reactor. In general, such processes can be defined based on whether or not there is a catalyst system change, and where there is a catalyst system change, whether or not the catalyst systems are "compatible" or "incompatible".

For example, transitions where the same catalyst system is used for both the first and second polymers are generally relatively easier since there is no issue of one catalyst system affecting the performance of the other or the properties of the polymer produced by the other. The same is generally the case where the catalyst systems are "compatible", this term generally referring to different catalyst systems which have no or relatively minimal influence on the performance of the other or the properties of the polymer produced by the other.

It is important to ensure that the bed of first polymer is "compatible" with the reaction conditions during the transition and for production of the second polymer, but generally processes with "compatible" catalyst systems can be accomplished in a "continuous" manner by simply stopping feed of one catalyst system, adjusting the reactor conditions, and starting feed of the second catalyst system. Although such transitions are relatively simple in concept, because of the volume of first polymer in the fluidised bed when the first catalyst system is stopped and time taken to replace this with polymer according to the specification of the second polymer, such processes can produce significant amounts of off-specification material during the transition.

Numerous methods to minimise the amount of off-specification material have been proposed. Examples include reductions in bed volume by lowering the height of the fluidised bed before the second catalyst system is introduced, and subsequently increasing the bed height back to the normal operational volume.

Transitions between what are generally referred to as "incompatible" catalyst systems can be more complicated. Whilst various continuous and semi-continuous transitions have been proposed, in many cases it is necessary to stop polymerisation, remove the bed of the first polymer, and therefore any remains of the first catalyst system, and refill the reactor with a new bed, called a seed-bed, of polymer prior to restarting polymerisation.

U.S. Pat. No. 6,838,532 relates to such transitions. In this document, the contents of the reactor are removed whilst maintaining a substantially closed system. Subsequently a substantially contaminant free seed bed is introduced into the reactor. The substantially contaminant free seedbed may be formed in the first place by recovering polymer product from the polymerisation reactor, purging this to remove contaminants, then storing this under nitrogen for subsequent use.

The present invention relates generally to such a transition. However, contrary to the process described in U.S. Pat. No. 6,838,532 we have now found it is advantageous to collect, store and introduce a contaminated seedbed to the reactor, and to reduce the amount of contamination in situ in the reactor.

Thus, in a first aspect, the present invention provides a process for transitioning from the production of a first polymer to the production of a second polymer in a gas phase fluidised bed or stirred bed reactor, said process comprising the steps of:

a) Conducting a first polymerisation reaction in the reactor using a first polymerisation catalyst system to produce a first polymer, b) Stopping the first polymerisation reaction and removing at least the majority of the polymer in the reactor, c) Introducing into the reactor a seed-bed comprising at least 50 ppm of contaminants, d) Treating the seed-bed in the reactor to reduce the amount of contaminants, e) Conducting a second polymerisation reaction in the reactor to produce a second polymer.

The reactor is preferably a gas phase fluidised bed reactor.

The reactor is initially producing a first polymer using a first polymerisation catalyst system. The first polymer may be any suitable polymer which can be produced in a gas phase fluidised or stirred bed reactor. Examples are propylene- and ethylene-based polymers, such as homopolymers and copolymers of propylene, and homopolymers and copolymers of ethylene.

Similarly, the first polymerisation catalyst system may include any catalyst suitable for the polymerisation. Commercially-used catalysts include Phillips catalysts, Ziegler catalysts and metallocene catalysts. It is also known to use mixed catalysts.

For avoidance of doubt, the term "catalyst" as used herein describes the catalytically active composition introduced into the polymerisation reactor, for example a Ziegler-Natta, Phillips (Chromium) or metallocene catalyst.

The term "catalyst system" as used herein describes the catalyst plus any co-catalyst or additive that is added with the catalyst to the polymerisation reactor, for example alkyl aluminium co-catalysts; external donors, such as silanes; or continuity additives, such as antistatic agents. Where no co-catalyst or other additive is used with the catalyst, then the terms "catalyst" and "catalyst system" are synonymous.

The reactor may be a "stand-alone" reactor, or may be one of a number of reactors, including one of two or more reactors operated in series. Where other reactors are present in series they may also be gas phase fluidised or stirred bed reactors or may be another type of reactor, such as slurry loop or stirred tank polymerisation reactors.

The first step in the transition is to stop the first polymerisation reaction and remove at least the majority of the polymer in the reactor. Generally the first step in stopping the first polymerisation reaction is to stop the feed of the first catalyst system. It can be noted that stopping the feed of the catalyst system does not in itself lead to an immediate stopping of polymerisation, and it is possible to allow the reaction to continue for some time whilst the activity dies off before polymer removal is commenced.

The removal of at least a majority of the polymer may be commenced only when the first polymerisation reaction has stopped. However, it is also possible to start to remove the polymer whilst the reaction continues—for example maintaining withdrawal rate whilst reaction dies off inherently starts to remove polymer faster than it is being formed.

It is also possible to commence the polymer removal before the feed of catalyst system is stopped.

Although the transition may be operated without use of a deactivating agent to stop the first reaction, it is possible to use one. Thus, after the catalyst system feed is stopped a deactivating agent may be added to the reactor to stop reaction completely. This may be done immediately after the stopping of the catalyst system feed, or the reaction may be allowed to continue for some time before the deactivating agent is added as noted above.

As a specific example, feed of the first polymerisation catalyst system may be stopped. The activity may be allowed to die off for a period of time of at least 15 minutes, and then polymer removal is commenced. Immediately prior to, or during, polymer removal a deactivating agent is added to stop the reaction completely.

Methods for the removal of the polymer are known. A preferred method involves maintaining the bed of polymer in the reactor in a fluidised state and removing the polymer bed through the normal product discharge conduits. Specific discharge conduits may be provided to enable complete removal of the polymer where the normal product discharge conduits cannot do this—for example if they are located relatively high in the reactor.

It can be noted that polymer is continuously or discontinuously removed during steady-state production to maintain an approximately constant level of polymer in the reactor. In contrast, as used herein "removing at least the majority of the polymer in the reactor" means that compared to the average amount of polymer in the reactor during steady-state production of the first polymer the amount of polymer remaining in the reactor is reduced by more than 50 wt %. (For avoidance of doubt, the amount of polymer remaining should be determined after the first polymerisation reaction has completely stopped.) Generally, it is preferred that the amount of polymer remaining in the reactor is reduced by at least 80 wt %, more preferably at least 90 wt %, and yet more preferably at least 95 wt % compared to the average amount of polymer in the reactor during steady-state production of the first polymer.

Generally it is most preferred to remove as much as possible of the first polymer i.e. to empty the reactor of the first polymer as completely as possible. However, relatively small amounts of polymer can remain in the reactor and be hard to remove. Most preferably, therefore, it is preferred to remove substantially all of the polymer in the reactor, by which is meant that compared to the average amount of polymer in the reactor during steady-state production of the first polymer the amount of polymer remaining in the reactor is reduced by at least 98 wt %.

In step (c) of the present invention a new seedbed is introduced into the reactor.

Prior to this step it may be necessary, or at least advantageous, to perform one or more steps to treat the reactor. For example, if not already used, a deactivating agent (also known as a "poison" or a "kill" agent) may be used to deactivate any remaining traces of the first polymerisation catalyst system (including any co-catalysts which might have been used). Examples of deactivating agents for various polymerisation catalyst systems are known, and include, depending on the catalyst system, air, water, carbon monoxide and carbon dioxide.

Purging may also be useful prior to seedbed introduction, in particular to remove any treatment agents which have been added. However, purging may instead (or in addition) be performed after seedbed introduction.

The seedbed is introduced from a suitable vessel in which it is previously stored, generally referred to hereinafter as a storage vessel or storage silo.

According to the process of the present invention the seedbed comprises at least 50 ppm of contaminants.

By "ppm of contaminants" as used herein is meant parts per million by weight of contaminants as measured in the gas phase. Similarly, reference to "amount of contaminants" means the amount of contaminants by weight as measured in the gas phase. In the process of the present invention the amount of contaminants in the seedbed of step (c) should be determined based on gas phase measurements in the storage container or vessel in which the seedbed is kept prior to its introduction to the reactor. The measured amount of contaminants may vary over time based on the conditions in the container or vessel where it is kept. Therefore, as used herein, the seedbed should comprise at least 50 ppm of contaminants when measured immediately prior to the introduction of the seedbed into the reactor, and this should be measured at the temperature and pressure in the vessel/container at this time.

Preferably the seedbed comprises greater than 55 ppm of contaminants, for example at least 65 ppm, and more preferably at least 75 ppm, such as at least 100 ppm, of contaminants. However, whilst it is possible to have even higher levels of contaminants as discussed further below, preferably the seedbed comprises less than 250 ppm of contaminants, and most preferably less than 100 ppm of contaminants.

As used herein, "contaminants" means components which act to inhibit the activity of polymerisation catalyst system or polymerisation catalyst system residues present in the seedbed. The contaminants may vary depending on the nature of the catalyst system, but generally include components which act as "deactivating agents" for the polymerisation catalyst system residues in the seedbed. Preferred examples according to the present invention include water, carbon monoxide and carbon dioxide.

Air/oxygen can also be used as the contaminant in the process of the present invention, but is not preferred since use of oxygen can lead to tainting issues in the subsequent reaction of step (e).

The seedbed is generally formed from an earlier polymerisation reaction. Such seedbeds are usually (but not always) formed of polymer recovered from the same reactor as the one into which it is to be introduced at an earlier time. Regardless of their source, seed beds usually contain catalyst system remnants from the earlier reaction. Although these may have been deactivated by the use of a deactivating agent, catalyst system residues still remain. It has been found that it is advantageous to store the seed bed under an amount of contaminants sufficient to prevent any (re-)activity of the catalyst system remnants.

The seedbed usually will have been deliberately maintained under an amount of contaminants during storage, this ensuring that all catalyst system (including co-catalyst residues remain inactive in the seedbed. The measured amount of contaminants maintained during this time may vary, either because the measured value will vary depending on the conditions in the container or vessel where it is kept as already noted, or because contaminant is "deliberately" added or removed. Usually the seedbed is maintained during storage with an amount of contaminants which is in excess to any nominal minimum required to deactivate all active sites, but significant excesses provide little further benefit whilst requiring more contaminant to be removed in step (d) of the present invention. In particular, the amount of contaminants is preferably maintained above 50 ppm as measured at any time throughout the storage period (and at the conditions in the storage container or vessel at that time) i.e.

it is not simply "topped up" just prior to introduction to the reactor. An upper limit on the amount of contaminants of 500 ppm is generally preferred.

Such a level is significantly below the level which might be expected from leaving a seedbed exposed to air, which would generally be expected to be at least 2000 ppm by weight and usually significantly higher (depending on the humidity in the air among other factors).

It should be noted that the polymerisation catalyst system residues in the seedbed will normally be of a different catalyst system to the first polymerisation catalyst system, and therefore it is not always the case that the contaminant in the seedbed will also be a kill agent for the first polymerisation catalyst system, which is why a separate treatment of the reactor prior to seedbed introduction can be required. Nevertheless, where the contaminant in the seedbed is also a kill agent for the first polymerisation catalyst system a separate treatment of the reactor prior to seedbed introduction may not be required.

It is possible to add contaminants to the seedbed in a storage silo, for example to form the contaminated seedbed from an obtained "contaminant-free" seedbed for introduction to the reactor.

The contaminant amount may also be monitored during storage to ensure it stays above a required amount.

More generally, it is advantageous to introduce into a storage silo a contaminated seedbed which already comprises at least 50 ppm of contaminants. This can in particular be achieved by adding the contaminant to polymer during post-polymerisation steps, and then using the contaminated polymer to form a contaminated seedbed. Since suitable contaminants for the seedbed include deactivating agents for the catalyst system it is therefore relatively simple to use a deactivated polymer from an earlier reaction with excess deactivating agent providing the required amount of contaminant. The seedbed can then be stored in this form. By introducing the seed bed to the reactor in contaminated form the contaminants can be removed under the controlled conditions inside the reactor.

Further, it has been found that the treatment to remove the contaminants in step (d), can often be integrated into the conventional reactor treatments performed prior to initiation of the second polymerisation reaction with little, if any, increase in the total transition time. Thus, the present invention not only provides advantages in the storage of the contaminated seedbed, but can avoid the steps previously required to obtain a "contaminant-free" seedbed described in U.S. Pat. No. 6,838,532.

Step (d) comprises treating the seed-bed in the reactor to reduce the amount of contaminants. Examples of treatment steps include purging with an inert gas and/or scavenging with an agent which will react with the contaminant.

Suitable "scavengers" are organometallic compounds which are reactive towards oxygen and/or water and/or polar compounds as defined in EP 0781300.

Preferably, the scavenger is a hydrocarbon aluminium compound of the formula $AlR_{(3-a)}X_a$ where R is alkyl, cycloalkyl, aryl or a hydride radical. Each alkyl radical can be straight or branched chain having from 1 to 20 carbon atoms, preferably 1 to 10 carbon atoms. X is a halogen or hydride, for example chlorine, bromine or iodine, with chlorine being preferred; a is 0, 1 or 2.

The amounts of contaminants which can be tolerated in the production of the second polymer depend somewhat on the contaminant and the sensitivity of the second polymerisation catalyst system to the contaminant.

However, in general terms, the absolute terms the amount of contaminants in the seedbed in the reactor should be reduced to less than 20 ppm, preferably to less than 10 ppm, and most preferably to less than 5 ppm. For avoidance of doubt, in the process of the present invention the amount of contaminants in the seedbed after treatment in step (d) should be determined based on gas phase measurements in the reactor at the temperature and pressure conditions in the reactor.

It is preferred that the reactor is maintained substantially closed both throughout the transition, by which is meant throughout the steps of bed removal and the seedbed introduction and through the transition generally, in order to minimise the introduction of additional contaminants to the reactor. Examples of how to do this are described in U.S. Pat. No. 6,838,532.

As also in U.S. Pat. No. 6,838,532, the term "substantially closed system" as used herein means that the reactor is not exposed to the atmosphere so as to allow contaminants into the reactor during the transition.

For example, rather than opening the reactor to atmosphere to empty it of the first polymer, the reactor may be emptied through the conventional product discharges used during polymerisation, as also described in U.S. Pat. No. 6,838,532. Similarly, the seed-bed comprising at least 50 ppm of contaminants can be introduced without opening the reactor to atmosphere through a suitable inlet line from a suitable storage silo.

It is also possible to "open" the reactor and the system be maintained "substantially closed" as used herein (and as used in U.S. Pat. No. 6,838,532) by having a positive pressure in the reactor to prevent the ingress of air and/or moisture from the atmosphere.

More preferably, however, the reactor is maintained closed throughout the transition.

The seedbed may be introduced to the reactor in step (c) in varying amounts. For example, the seedbed may be introduced at a lower level than the desired "normal" operating level, and the bed level increased once reaction is commenced. This generally reduces the amount of the seedbed required and minimises the time taken to load the seedbed and to treat it.

However, it is also possible to introduce a "full" seedbed, by which is meant in an amount corresponding to the desired "normal" operating level. Whilst this may add to introduction and treatment times, the corollary is that such bed volumes are generally easier to control and start-up than significantly reduced bed levels.

Subsequent to the seedbed introduction a second polymerisation reaction to produce a second polymer is conducted.

Step (e) requires the introduction of a polymerisation catalyst system for the second polymerisation reaction. In general, the polymerisation catalyst system may be any catalyst system suitable for the polymerisation. The polymerisation catalyst system used in step (e) may be a different polymerisation catalyst system to the first polymerisation catalyst system, but need not be.

Generally, therefore, the present invention may be applied in any transition where it is desired to introduce a seedbed for the second polymerisation reaction.

This may be, for example, where different catalyst systems are used to produce the first and second polymers, which catalyst systems are incompatible.

As another example, the present invention may also be applied where the first polymer is incompatible with the reaction conditions for the second polymer. An example of such an incompatibility is where the second polymer is produced at a temperature higher than the sintering temperature of the first polymer. In such a situation it is necessary to remove the bed of first polymer to prevent any of the first polymer melting at the conditions for the second polymer. This can occur independently of whether the catalyst systems used for the first and second polymers are the same or different, let alone whether they are incompatible.

As with the first polymer, the second polymer may be any suitable polymer which can be produced in a gas phase fluidised or stirred bed reactor. Generally the first and second polymers are based on the same principal monomer. Thus, where the first polymer is a homopolymer or copolymer of propylene, then the second polymer will also be a homopolymer or copolymer of propylene, whereas where the first polymer is a homopolymer or copolymer of ethylene, then the second polymer will also be a homopolymer or copolymer of ethylene.

Similarly, the polymerisation catalyst system in step (e) may again include any catalyst suitable for the polymerisation, including a Phillips catalyst, a Ziegler catalyst, a metallocene catalyst or a mixed catalyst.

Generally however it is preferred that the polymerisation catalyst system introduced in step (e) is a different catalyst system to the first polymerisation catalyst system, and most preferably the catalyst systems are "incompatible".

As used herein, the first and second catalyst systems are "incompatible" if one or more of the following applies:
1) catalyst system when tested separately under the conditions in the second polymerisation reaction one of the catalyst systems produces polymers having a weight average molecular weight greater than two times higher than the weight average molecular weight produced by the other catalyst system;
2) when tested separately under the conditions in the second polymerisation reaction the polymers produced by both catalyst systems differ in comonomer incorporation (expressed in mol %) by more than 30%;
3) compared to the productivity (expressed in g polymer/g catalyst) obtained when the second catalyst system is tested alone under the conditions of the second polymerisation reaction, the productivity obtained by replacing 10% by weight of the second catalyst with the same mass of the first catalyst and testing the mixture of the first and second catalyst systems under the same conditions is changed by 50% or more.

For avoidance of doubt, the productivity in the third test above is based on the mass of catalyst (not catalyst system), and the 10% of the second catalyst replaced is replaced with an equivalent mass of the first catalyst. Thus, in fact, the total mass of catalyst ("g catalyst") is the same when the mixed catalyst system is tested as when the second catalyst system is tested. The total mass of the first and second catalyst systems may however vary depending on the other components which may be part of the respective catalyst systems.

Molecular weight and comonomer content should be determined by the methods described in WO 2011/089112.

EXAMPLES

Example 1

Comparative

A fluidised bed gas phase process is provided for polymerisation of ethylene with 1-butene as comonomer. The process comprises a fluidised bed gas phase reactor and a degassing train, whereby produced polymer is removed from the reactor and passed to the degassing train. In the degassing train the polymer is treated to remove unreacted hydrocarbons before being passed to storage or further treatment e.g. extrusion.

In a first period of operation, the reactor was operated to polymerise ethylene monomer with 1-butene as comonomer using a Ziegler-based catalyst system. The product had a density (d) of 920 kg/m$^3$ and a melt index ($MI_{2.16}$) of 2.1.

During this operation a portion of polymer powder was recovered from the degassing train and placed into a seed bed storage vessel.

After the first operation with the Ziegler catalyst system the reactor was transitioned to a second period of operation, with polymerisation taking place using a metallocene-based catalyst system.

At the end of the second period of operation, it was desired to transition to a third period of operation using the same Ziegler-based catalyst system as in the first period.

In particular, at the end of the second period the reaction was stopped, and the reactor emptied of its metallocene polymer powder content. It was desired to load the portion of polymer powder recovered during the first operation, but poor powder flowability was observed and it proved difficult to obtain gravity flow from the Ziegler seedbed.

Detailed analysis of the polymer showed signs of post polymerisation having occurred in the seed bed during the storage. The remaining hydrocarbons on the powder, in particular traces of 1-butene, had polymerised on the still active powder to create at the surface of the particles some polybutene which started to 'bridge' between the powder particles.

Example 2

Example 1 was repeated except that a portion of polymer powder was recovered during the first period of operation from the degassing train and placed into a seed bed storage vessel under an amount of water (contaminant) of 75 ppm weight relative to the gas phase in the storage vessel.

When it was desired to transition to the third period of operation using the same Ziegler-based catalyst system as in the first period, the portion of polymer powder recovered during the first operation was loaded as a seedbed without any flowability issues being observed.

Analysis of a sample of the seedbed was also undertaken and no signs of post-polymerisation were observed.

Example 3

Comparative

This Example took place in the same reactor as Examples 1 and 2. In this Example, the first period of operation was operated to polymerise ethylene monomer with 1-butene as comonomer using a metallocene-based catalyst system. The product had a density (d) of 912 kg/m$^3$ and a melt index ($MI_{2.16}$) of 15.

During this operation a portion of polymer powder was recovered from the degassing train and placed into a seed bed storage vessel.

After the first operation with the metallocene-based catalyst system the reactor was transitioned to a second period of operation, with polymerisation taking place using a Ziegler-based catalyst system.

At the end of the second period of operation, it was desired to transition to a third period of operation using the same metallocene-based catalyst system as in the first period.

In particular, at the end of the second period the reactor was emptied of its Ziegler powder content, and the portion of polymer powder recovered during the first operation was loaded as a seedbed.

The seedbed loaded without flowability issues, and was purged and scavenged. However, when the gas phase composition was commenced reaction occurred (prior to any new catalyst system injection). This led to off-specification material generation and agglomerates formation.

Analysis showed that this polymerisation reaction was due to reactivation of catalyst sites that had not been irreversibly deactivated; the agglomerate formation could be explained by the fact that the polymerisation started while the gas phase composition was not completed and not representative of its normal composition under normal reaction conditions.

Example 4

Example 3 was repeated except that a portion of polymer powder was recovered during the first period of operation from the degassing train and placed into a seed bed storage vessel under an amount of water (contaminant) of 80 ppm weight relative to the gas phase in the storage vessel.

When the gas phase was composed no signs of reaction where observed until "new" catalyst system injection was resumed.

The reaction started normally and product in specification was directly produced without hot spots or agglomerates formation during the third period of operation.

The invention claimed is:

1. A process for transitioning from the production of a first polymer to the production of a second polymer in a gas phase fluidised bed or stirred bed reactor, said process comprising the steps of:
   a) Conducting a first polymerisation reaction in the reactor using a first polymerisation catalyst system to produce a first polymer,
   b) Stopping the first polymerisation reaction and removing at least the majority of the polymer in the reactor,
   c) Introducing into the reactor a seed-bed comprising at least 50 ppm of contaminants, wherein the seedbed has been maintained under at least 50 ppm but less than 500 ppm of contaminants during storage,
   d) Treating the seed-bed in the reactor to reduce the amount of contaminants, and
   e) Conducting a second polymerisation reaction in the reactor to produce a second polymer.

2. A process according to claim 1 wherein step (b) comprises stopping the feed of the first catalyst system, and allowing the reaction to continue whilst the activity dies off before polymer removal is commenced.

3. A process according to claim 2 wherein the removal of polymer is commenced whilst the reaction continues and/or before the feed of catalyst system is stopped.

4. A process according to claim 1 wherein the amount of polymer remaining in the reactor after step (b) is reduced by at least 80 wt % compared to the average amount of polymer in the reactor during steady-state production of the first polymer.

5. A process according to claim 1 wherein prior to step (c) one or more steps are performed to treat the reactor, said steps comprising at least one of (i) use of a deactivating agent to deactivate any remaining traces of the first polymerisation catalyst system, and (ii) purging to remove any treatment agents which have been added.

6. A process according to claim 1 wherein the seedbed comprises greater than 55 ppm of contaminants and/or wherein the seed bed comprises less than 250 ppm of contaminants.

7. A process according to claim 1 wherein the contaminants comprise one or more of water, carbon monoxide and carbon dioxide and/or wherein in step (d) the amount of contaminants in the seed bed in the reactor is reduced to less than 20.

8. A process according to claim 1 wherein the reactor is maintained substantially closed both throughout the bed removal, the seedbed introduction and the transition.

9. A process according to claim 1 wherein the reactor is a gas phase fluidised bed reactor.

10. A process according to claim 6 wherein the seedbed comprises less than 100 ppm of contaminants.

11. A process according to claim 6 wherein the contaminants comprise one or more of water, carbon monoxide and carbon dioxide.

12. A process according to claim 6 wherein in step (d) the amount of contaminants in the seedbed in the reactor is reduced to less than 20 ppm.

13. A process according to claim 6 wherein the reactor is maintained substantially closed both throughout the bed removal, the seedbed introduction and the transition.

14. A process according to claim 6 wherein the reactor is a gas phase fluidised bed reactor.

15. A process according to claim 7 wherein in step (d) the amount of contaminants in the seedbed in the reactor is reduced to less than 10 ppm.

16. A process according to claim 7 wherein the reactor is maintained substantially closed both throughout the bed removal, the seedbed introduction and the transition.

17. A process according to claim 7 wherein the reactor is a gas phase fluidised bed reactor.

18. A process according to claim 4 wherein the amount of polymer remaining in the reactor after step (b) is reduced by at least 95 wt % compared to the average amount of polymer in the reactor during steady-state production of the first polymer.

19. A process according to claim 6 wherein the seedbed comprises at least 75 ppm of contaminants.

20. A process according to claim 12 wherein in step (d) the amount of contaminants in the seedbed in the reactor is reduced to less than 10 ppm.

* * * * *